(12) United States Patent
Yang et al.

(10) Patent No.: US 11,403,220 B2
(45) Date of Patent: Aug. 2, 2022

(54) METHOD AND APPARATUS FOR ADAPTIVE CACHE LOAD BALANCING FOR SSD-BASED CLOUD COMPUTING STORAGE SYSTEM

(71) Applicant: Samsung Electronics Co., Ltd., Gyeonggi-do (KR)

(72) Inventors: Zhengyu Yang, Malden, MA (US); Morteza Hoseinzadeh, La Jolla, CA (US); Thomas David Evans, San Marcos, CA (US); Clay Mayers, San Diego, CA (US); Thomas Bolt, San Diego, CA (US)

(73) Assignee: Samsung Electronics Co., Ltd.

( * ) Notice: Subject to any disclaimer, the term of this patent is extended or adjusted under 35 U.S.C. 154(b) by 6 days.

(21) Appl. No.: 17/006,285

(22) Filed: Aug. 28, 2020

(65) Prior Publication Data
US 2020/0394137 A1 Dec. 17, 2020

Related U.S. Application Data

(63) Continuation of application No. 15/971,349, filed on May 4, 2018, now abandoned.
(Continued)

(51) Int. Cl.
*G06F 12/0811* (2016.01)
*H04L 67/104* (2022.01)
(Continued)

(52) U.S. Cl.
CPC .......... *G06F 12/0811* (2013.01); *G06F 3/067* (2013.01); *H04L 41/142* (2013.01);
(Continued)

(58) Field of Classification Search
CPC ................ G06F 12/0811; G06F 3/067; G06F 2212/1024; G06F 2212/22;
(Continued)

(56) References Cited

U.S. PATENT DOCUMENTS 7,321,926 B1  1/2008  Zhang et al.
8,930,592 B2  1/2015  Zhou et al.
(Continued)

OTHER PUBLICATIONS

Zhang, Qi et al., Workload-Aware Load Balancing for Clustered Web Servers, IEEE Transactions on Parallel and Distributed Systems . . . vol. 16, No. 3, Mar. 2005, Copyright 2005 IEEE, pp. 219-233.
(Continued)

*Primary Examiner* — Nanci N Wong
(74) *Attorney, Agent, or Firm* — The Farrell Law Firm, P.C.

(57) ABSTRACT

An apparatus, a method, a method of manufacturing an apparatus, and a method of constructing an integrated circuit are provided. A processor of an application server layer detects a degree of a change in a workload in an input/output stream received through a network from one or more user devices. The processor determines a degree range, from a plurality of preset degree ranges, that the degree of the change in the workload is within. The processor determines a distribution strategy, from among a plurality of distribution strategies, to distribute the workload across one or more of a plurality of solid state devices (SSDs) in a performance cache tier of a centralized multi-tier storage pool, based on the determined degree range. The processor distributes the workload across the one or more of the plurality of solid state devices based on the determined distribution strategy.

18 Claims, 8 Drawing Sheets

Related U.S. Application Data

(60) Provisional application No. 62/609,871, filed on Dec. 22, 2017.

(51) Int. Cl.
| | |
|---|---|
| *H04L 41/142* | (2022.01) |
| *H04L 67/1097* | (2022.01) |
| *G06F 3/06* | (2006.01) |
| *H04L 47/125* | (2022.01) |

(52) U.S. Cl.
CPC .......... *H04L 47/125* (2013.01); *H04L 67/104* (2013.01); *H04L 67/1097* (2013.01); *G06F 2212/1024* (2013.01); *G06F 2212/22* (2013.01); *G06F 2212/608* (2013.01)

(58) Field of Classification Search
CPC ............. G06F 2212/608; H04L 41/142; H04L 47/125; H04L 67/104; H04L 67/1097
See application file for complete search history.

(56) References Cited

U.S. PATENT DOCUMENTS

| | | | | |
|---|---|---|---|---|
| 2008/0092143 | A1* | 4/2008 | Koseki | G06F 11/3433 718/105 |
| 2009/0013327 | A1* | 1/2009 | Bulfin | G06F 9/505 718/105 |
| 2009/0271515 | A1* | 10/2009 | Iyengar | H04L 65/1006 709/226 |
| 2015/0212840 | A1 | 7/2015 | Biran | |
| 2016/0269501 | A1* | 9/2016 | Usgaonkar | H04L 67/2842 |
| 2017/0024316 | A1* | 1/2017 | Park | G06F 9/5088 |
| 2017/0046089 | A1 | 2/2017 | Yang et al. | |
| 2017/0090802 | A1 | 3/2017 | Margetts et al. | |
| 2017/0091032 | A1* | 3/2017 | Peake | G06F 3/0659 |
| 2017/0193077 | A1 | 7/2017 | Goikhman et al. | |

OTHER PUBLICATIONS

Ren, Xiaona et al., A Dynamic Load Balancing Strategy for Cloud Computing Platform Based on Exponential Smoothing Forecast . . . Proceedings of IEEE CCIS2011, Copyright 2011 IEEE, pp. 220-224.

Hsung-Pin Chang et al., "A Load-Balancing on Smart City; IEEE 2nd International Conference on Data Science and Systems", (HPCC/SmartCity/DSS), 2016, 8 pages.

* cited by examiner

US 11,403,220 B2

METHOD AND APPARATUS FOR ADAPTIVE CACHE LOAD BALANCING FOR SSD-BASED CLOUD COMPUTING STORAGE SYSTEM

PRIORITY

This application is a Continuation Application of U.S. application Ser. No. 15/971,349, filed in the U.S. Patent and Trademark Office (USPTO) on May 4, 2018, which claims priority under 35 U.S.C. § 119(e) to a U.S. Provisional Patent Application No. 62/609,871, filed in the USPTO on Dec. 22, 2017, the entire contents of which are incorporated herein by reference.

FIELD

The present disclosure relates generally to load balancing of a cloud computing storage system, and more particularly, to adaptive load balancing in a cache solid state device (SSD) tier of a multi-tier storage system based on the degree of a workload spike.

BACKGROUND

SSDs generally have an input/output (I/O) performance that is orders of magnitude faster than that of traditional hard disk drives (HDDs). In view of this difference in performance, SSDs are utilized as a performance cache tier in modern datacenter storage systems. These SSDs are intended to absorb hot datasets to reduce the long I/O response time that would occur if these I/Os were forwarded to low-end SSDs or even slower HDDs.

Different applications have different workload characteristics. When such applications are used in coordination with modern datacenter storage systems (e.g., cloud computing storage systems), in order to satisfy peak use, efficient resource allocation schemes are required. However, traditional load balancers, such as, for example, random and greedy algorithms, neglect cases that involve a spike in workload, and experience significant performance degradation.

SUMMARY

According to one embodiment, an apparatus is provided that includes a memory and a processor. The processor is configured to detect a degree of a change in a workload in an I/O stream received through a network from one or more user devices. The processor is also configured to determine a degree range, from a plurality of preset degree ranges, that the degree of the change in the workload is within. The processor is further configured to determine a distribution strategy, from among a plurality of distribution strategies, to distribute the workload across one or more of a plurality of SSDs in a performance cache tier of a centralized multi-tier storage pool, based on the determined degree range. Finally, the processor is configured to distribute the workload across the one or more of the plurality of solid state devices based on the determined distribution strategy.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
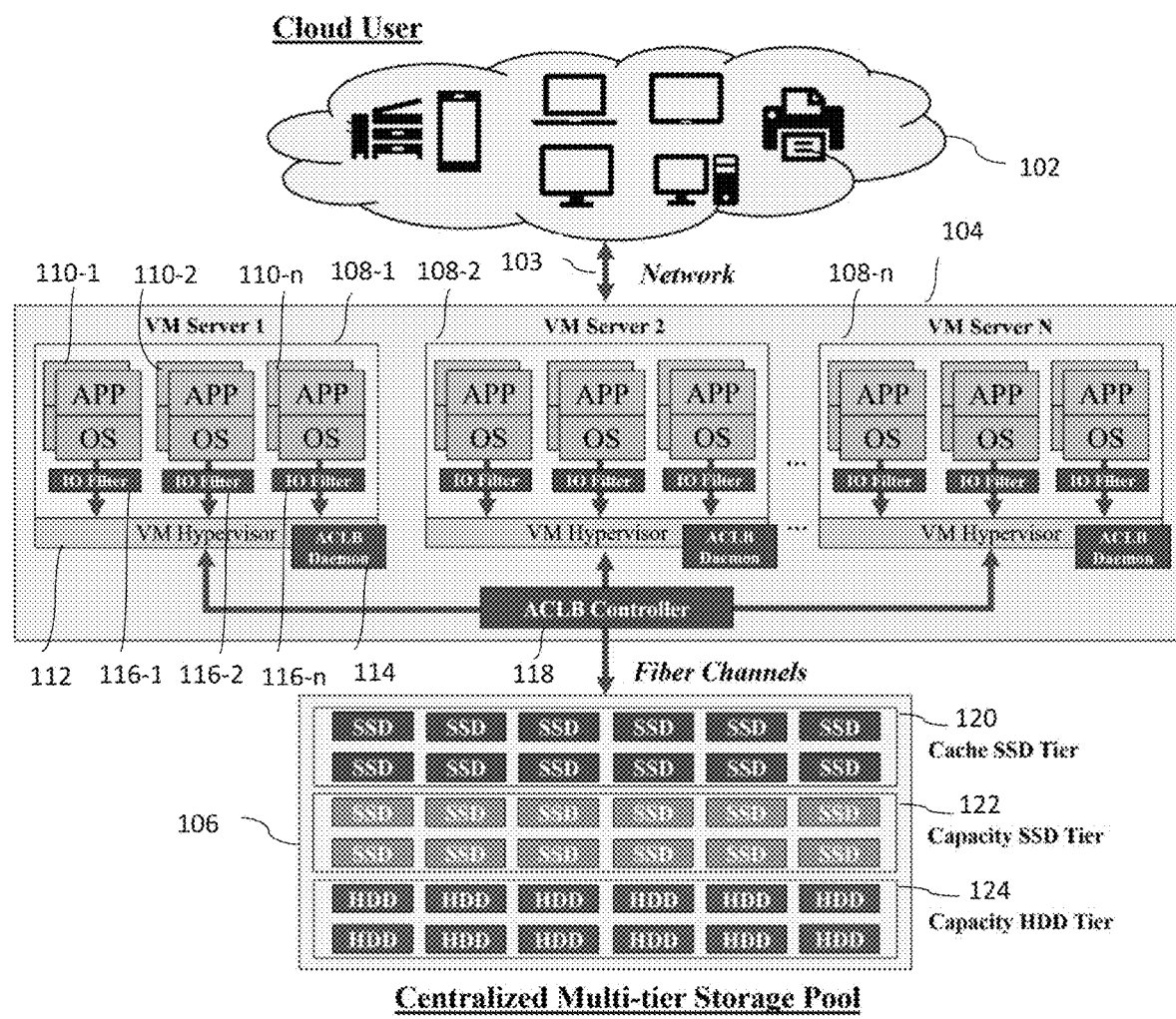
FIG. 1 is a diagram illustrating a system architecture that includes an adaptive cache load balancer (ACLB), according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents described herein.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An adaptive cache load balancer (ACLB) is described herein that utilizes a spike-aware algorithm to detect a workload change (i.e., I/O spike). In response to detecting the workload change, the ACLB adaptively uses different strategies to distribute the workload across SSDs in the performance cache tier to improve performance and extend the lifetimes of the SSDs. The distribution is performed by balancing usage of one or more types of SSD resources, such as, for example, throughput, bandwidth, storage space, and a worn-out level (i.e., program/erase (P/E) cycle usage).

Referring initially to FIG. 1, a diagram illustrates a system architecture that includes the ACLB, according to an embodiment of the present disclosure. Specifically, the system architecture includes a cloud user layer 102, an application server layer 104, and a centralized multi-tier storage pool 106.

The cloud user layer 102 includes heterogeneous application users that send requests through their devices to the cloud through a network 103. Each user may have a different request pattern resulting in differing temporal and spatial distributions of data.

The application server layer 104 includes multiple physical virtual machine servers 108-1, 108-2, 108-n, each of which includes one or more virtual machines (VMs) 110-1, 110-2, 110-n.

VMs run the guest operating system (OS) and applications, and are isolated from each other. Cloud service vendors may "rent" these VMs to application service users. VMs may have different workload patterns based on user applications, and thus, they will have different levels of sensitivity to storage device speeds. A VM hypervisor 112 hosts the one or more VMs 110-1, 110-2, 110-n for a given physical server 108-1. The VM hypervisor 112 is responsible for scheduling, resource management, system software application programming interface (API), and hardware virtualization. An ACLB daemon 114 is installed on the VM hypervisor 112 of each physical server 108-1, and receives input from respective ACLB I/O filters 116-1, 116-2, 116-n that correspond to each of the VMs 110-1, 110-2, 110-n.

The ACLB I/O filters 116-1, 116-2, 116-n are responsible for collecting I/O-related statistics of every VM. The data may be collected at a sample period rate and the results may be sent to the ACLB Daemon 114 on the host system responsible for collecting all data from all VMs.

The ACLB daemon 114 from each of the physical servers 108-1, 108-2, 108-n communicates with a single ACLB controller 118 within the application server layer 104. The ACLB Daemon 114 tracks the workload change (e.g., the I/O access pattern change) of the physical server 108-1, and collects device runtime performance information from the ACLB controller 118 and the ACLB I/O filters 116-1, 116-2, 116-n.

The ACLB may consist of the ACLB I/O filters 116-1, 116-2, 116-n, the ACLB daemons 114, and the ACLB controller 118.

The ACLB controller (or processor) 118 may be running on a dedicated server or on an embedded system in the storage system. The ACLB controller 118 is responsible for making I/O allocation decisions.

The physical servers 108-1, 108-2, 108-n are connected to the centralized multi-tier storage pool layer 106 through fiber channels, or some other means, to share the backend SSD-HDD hybrid storage systems or all flash multiple tier SSD storage systems, which include, for example, non-volatile memory express (NVMe) SSDs, 3D cross point (XPoint) NVM SSDs, multi-level cell (MLC)/triple-level cell (TLC)/quad-level cell (QLC) SSDs, and traditional spinning HDDs. Each tier of the storage pool 106 has different specialties, such as, for example, fast speed, large storage capacity, etc. The tiers include a cache SSD tier 120, a capacity SSD tier 122, and a capacity HDD tier 124. Embodiments of the present disclosure focus on load balancing of the workload in a top tier, which is usually the cache SSD tier 120 (or performance cache tier) consisting of the fastest and most expensive SSDs in the centralized multi-tier storage pool layer 106.

Herein, a multi-strategy load balancer provides different strategies under different workload spike scenarios. Performance cache tier SSD information is periodically retrieved, and based on workload spike detection results, different strategies are utilized for I/O stream allocation. Specifically, the performance cache tier SSD information is retrieved by calling a workload spike detection component. Based on the spike degree results, the ACLB categorizes a current I/O stream into one of three different ranges, and one of three different corresponding strategies is used to allocate the I/O stream.

Herein, each individual I/O request is not considered since it is too fine-grained and expensive for conducting an optimization calculation. Instead, an I/O stream is considered, which is defined as a batch of I/O requests having the following proprieties:

1. correlated with applications (i.e., from the same application);
2. storing similar lifetime data into the same erase block and reducing write amplification (garbage collection overhead), has locality patterns; and
3. all associated data invalidated at the same time (e.g., updated, trimmed, unmapped, deallocated, etc.).

With multi-stream SSDs, I/O streams may be assigned by associating each application write thread operation with a stream, so that an I/O stream provides better endurance and improved performance.

Workload spike detection methods are not limited strictly to those disclosed herein. However, in one example, an index of dispersion I is used to detect a workload spike in the incoming traffic. The advantage of utilizing the index of dispersion I is that it can qualitatively capture spikes in a single number, and thus, provide a simple yet powerful way to promptly identify the start and the end of a spike period. The mathematical definition of the index of dispersion I of a stochastic process is provided in Equation (1) below:

$$I = SCV \left( 1 + \alpha \cdot \sum_{k \in [k, K_{max}]} ACF(k) \right) \quad (1)$$

where SCV is the squared-coefficient of variation and ACF (k) is the autocorrelation function at lag K. α is a knob to adjust the weight of the autocorrelation function ADF(k). The joint presence of SCV and autocorrelations in the index of dispersion I is sufficient to discriminate traces with different spike intensities, and thus, to capture changes in user demands.

The index of dispersion I may only be based on one aspect, such as, for example, working volume, or may be based on multiple aspects, such as, for example, a comprehensive equation based on:
1. working volume size (WVS): the total amount of data (in bytes) accessed in the disk; or
2. working set size (WSS): the total address range (in bytes) of accessed data, which is the unique set of WVS. A large working set covers more disk space.

Additionally, the following factors may also be included in consideration of workload spike detection:
1. read/write ratio (RWR): the number of write I/Os divided by the total number of I/Os.
2. sequential/random ratio (SRR): the amount (in bytes) of total sequential I/Os (both read and write) divided by the total I/O amount (in bytes). In general, SSDs have better performance under sequential I/Os than under random I/Os.

Figure 2:
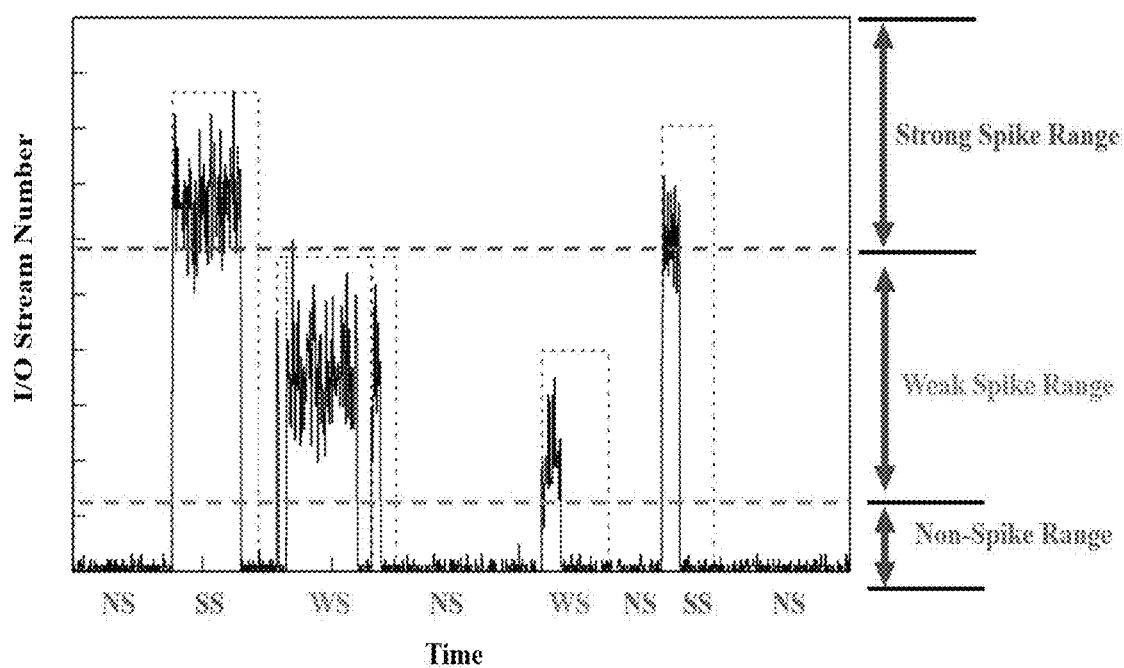
FIG. 2 is diagram illustrating an example of workload spike detection, according to an embodiment of the present disclosure.

FIG. 2 is a diagram illustrating an example of workload spike detection, according to an embodiment of the present disclosure. As shown, the diagram has an x-axis of time and a y-axis of index of dispersion I, which provides a degree of a detected workload spike. However, the y-axis may be any type of spike measurement value. The ACLB categorizes workload spike degrees into three ranges: strong spike ($\rho_S$), weak spike ($\rho_W$), and non-spike ($\rho_N$), based on corresponding preset range thresholds. For example, [0, 30] may be set as a non-spike range, [30, 70] may be set as a weak spike range, and [70, 100] may be set as a strong spike range.

For cases involving the detection of both strong and weak spikes, The ACLB uses a join shortest queue (JSQ)-based runtime random-greedy algorithm. Specifically, during runtime, ACLB selects the top K number of SSDs with the shortest queues, and conducts random allocation among these top K SSDs. For cases involving no spike detection, an optimization framework calculation is performed.

Figure 3:
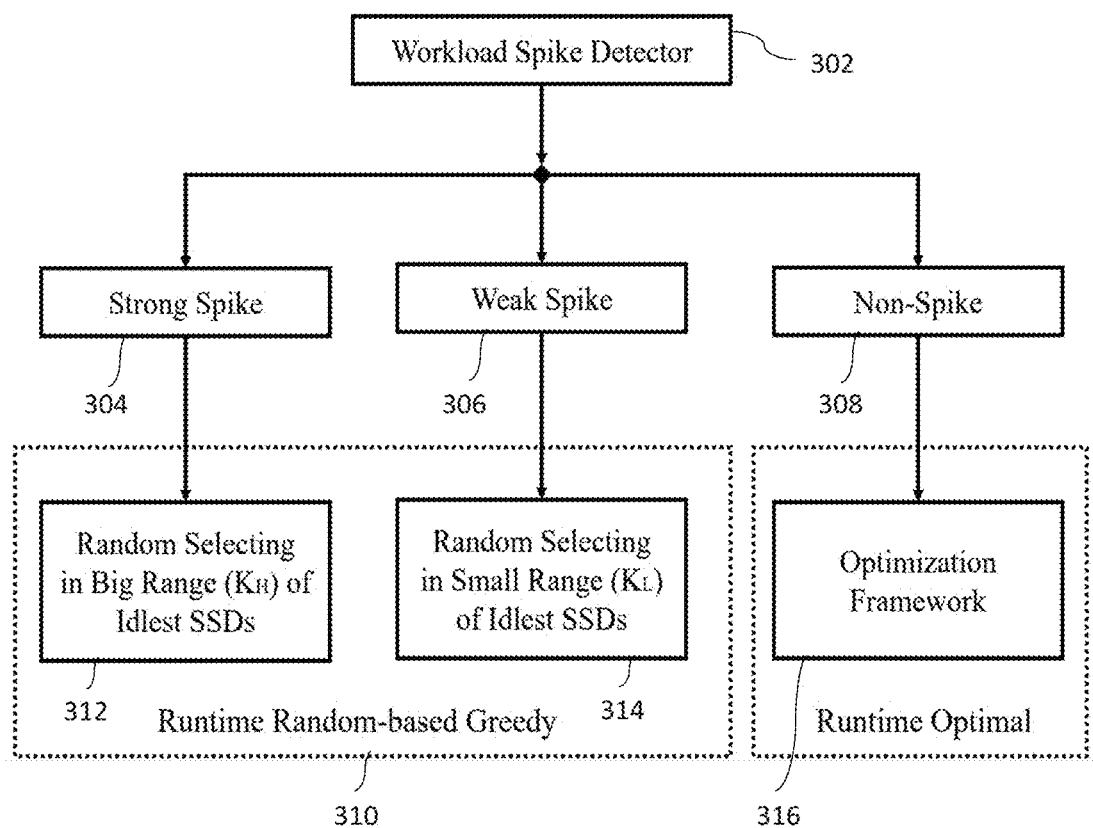
FIG. 3 is flowchart illustrating a method for detecting and compensating for a workload spike, according to an embodiment of the present disclosure.

Referring now to FIG. 3, a flowchart illustrates a method for detecting and compensating for a workload spike, according to an embodiment of the present disclosure. A workload spike detector 302 is used to detect the existence and magnitude of a workload spike. The workload spike detector may detect a strong spike in block 304, a weak spike in block 306, or may not detect a spike in block 308. If a strong spike is detected in block 304, the JSQ-based runtime random-greedy algorithm 310 is used in accordance with a large range ($K_H$) of the idlest, or least busy SSDs, in block 312. If a weak spike is detected in block 306, the JSQ-based runtime random-greedy algorithm 310 is used in accordance with a small range ($K_L$) of the idlest SSDs, in block 314. If no spike is detected in block 308, the optimization framework calculation is performed, in block 316.

Figure 4:
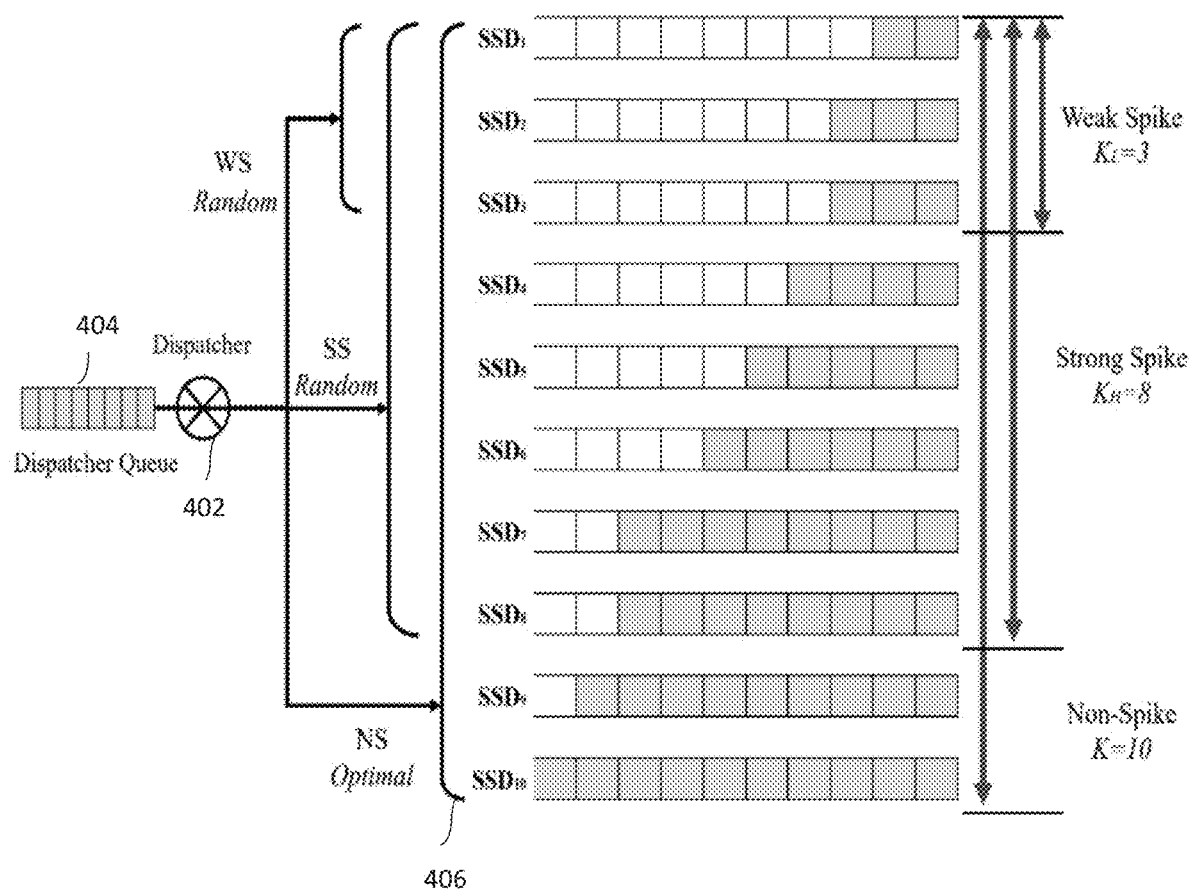
FIG. 4 is a diagram illustrating the dispatching of jobs of an I/O stream based on the detected workload spike, according to an embodiment of the present disclosure.

FIG. 4 is a diagram illustrating the dispatching of jobs of an I/O stream based on the workload spike, according to an embodiment of the present disclosure. A dispatcher 402 dispatches I/O streams from a dispatcher queue 404 to SSDs 406. In detail, under the non-spike scenario, the ACLB selects the disk for the I/O based on the optimization framework. Under the strong spike scenario, the ACLB selects a large range ($K_H$) of the idlest SSDs and conducts random allocation among these selected SSDs for the I/O job. Under the weak spike scenario, the ACLB selects a small range ($K_L$) of the idlest SSDs and conducts random allocation among these selected SSDs for the I/O job. Full optimization take a greater amount of time and is therefore not suitable for spike cases.

Figure 5:
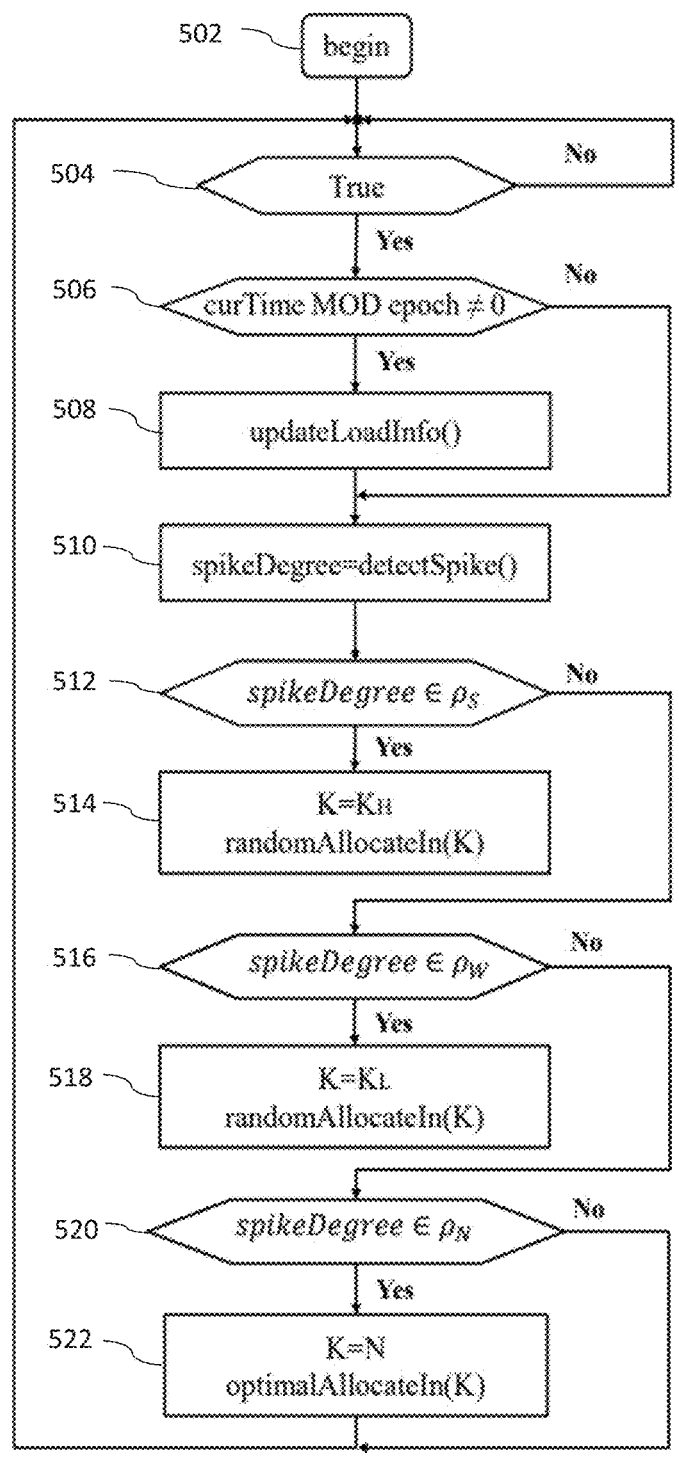
FIG. 5 is a flowchart illustrating a method for adaptive cache load balancing, according to an embodiment of the present disclosure.

FIG. 5 is a flowchart illustrating a method for adaptive cache load balancing, according to an embodiment of the present disclosure. Upon determining to begin the methodology in steps 502 and 504, it is determined, for each I/O stream, whether the current time is the beginning of an epoch, in step 506. If the current time is the beginning of an epoch, load information from all SSDs is updated, in step 508. If time divided by epoch length results in a 0 remainder, it is the epoch boundary and new load data is obtained. Specifically, if it is the beginning of a new epoch, the ACLB will collect queue information from all SSDs by calling the function updateLoadInfo( ), in step 508. If the current time is not the beginning of an epoch, the methodology proceeds directly to step 510 using the load data that was already obtained at the start of the current epoch.

In step 510, a degree of a detected workload spike is determined. In step 512, it is determined whether the degree of the workload spike is within the strong spike range $\rho_S$. If the spike degree is within the strong spike range $\rho_S$, a JSQ-based runtime random-greedy algorithm is used in accordance with a large range ($K_H$) of the idlest SSDs, in step 514. Referring back to the embodiment of FIG. 4, the total number of available SSDs is 10 (K=10). In cases involving the detection of a strong spike, the number of best SSD candidates $K_H$ should be set close to (or equal to) the total number of available SSDs. As shown in FIG. 4, $K_H$=8.

Figure 6:
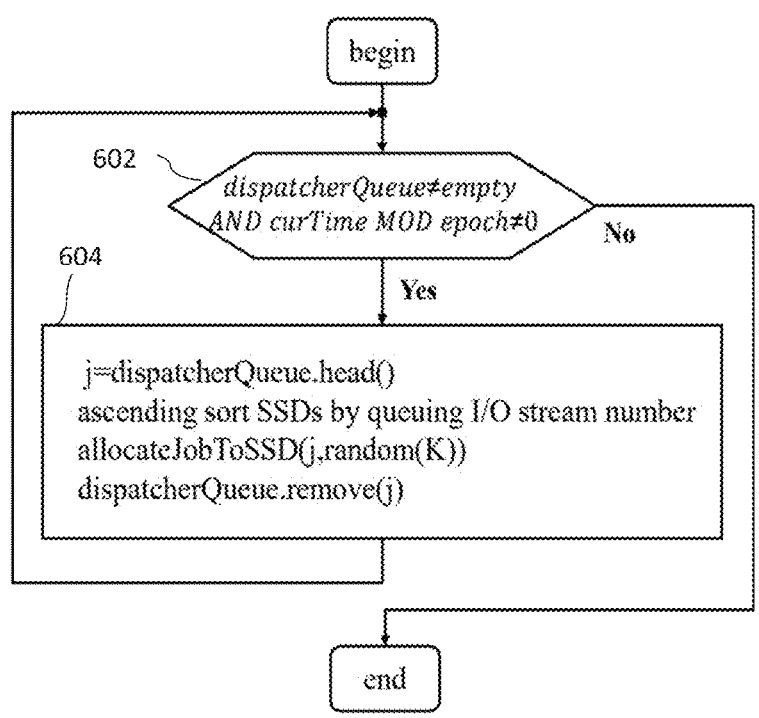
FIG. 6 is a flowchart illustrating a method for selection of SSDs when a strong workload spike is detected, according to an embodiment of the present disclosure.

Specifically, in the JSQ-based runtime random-greedy algorithm, the ACLB conducts random allocation among the top $K_H$ SSDs. FIG. 6 is a flowchart illustrating a method for selection of SSDs when there is a strong workload spike, according to an embodiment of the present disclosure. After determining that the dispatcher queue is not empty and the current time is not the beginning of an epoch, in step 602, the ACLB ascendingly sorts SSDs by the number of active I/O streams that are queued, randomly picks an SSD in the $K_H$ idlest SSDs to assign the current job, and removes the job from the dispatcher queue 404, in step 604.

Since $K_H$ is close to the total number of SSDs, ACLB has a behavior similar to a random assignment method, which allows the spike workload to be shared among a large number of top idlest SSDs, thereby alleviating the imbalance of load.

Referring back to FIG. 5, if it is determined in step 512 that the spike degree is not within the strong spike range $\rho_S$, it is determined whether the spike degree is within the weak spike range $\rho_W$, in step 516. If it is determined that the spike degree is within the weak spike range $\rho_W$, the JSQ-based runtime random-greedy algorithm is used in accordance with a small range ($K_L$) of the idlest SSDs, in step 518. This algorithm functions in the same manner as described in FIG. 6, only using $K_L$ SSDs instead of $K_H$ SSDs. When it is not the beginning of each epoch, the ACLB allocates the head I/O request from the dispatcher queue randomly to the top K idlest SSDs. Once complete, the ACLB removes the I/O request from the dispatcher queue.

In cases involving the detection of a weak spike, the number of best SSD candidates $K_L$ is set to a lower bound of the range. For example, as shown in FIG. 4, $K_L$=3. Also of note, if $K_L$=1, ACLB performs exactly the same as the "greedy" load balancer, which always selects the idlest SSD with the shortest queue length, and thus, achieves good performance in terms of waiting time.

Referring back to FIG. 5, if it is determined in step 516 that the spike degree is not within the weak spike range $\rho_W$, it is determined whether the spike degree is within the non-spike range ($\rho_N$), in step 520. If it is determined that the spike degree is in the non-spike range ($\rho_N$), a runtime optimization framework is performed over all K SSDs, in step 522. If it is determined that the spike degree is not within the non-spike range ($\rho_N$), the methodology returns to step 502 and repeats.

Figure 7:
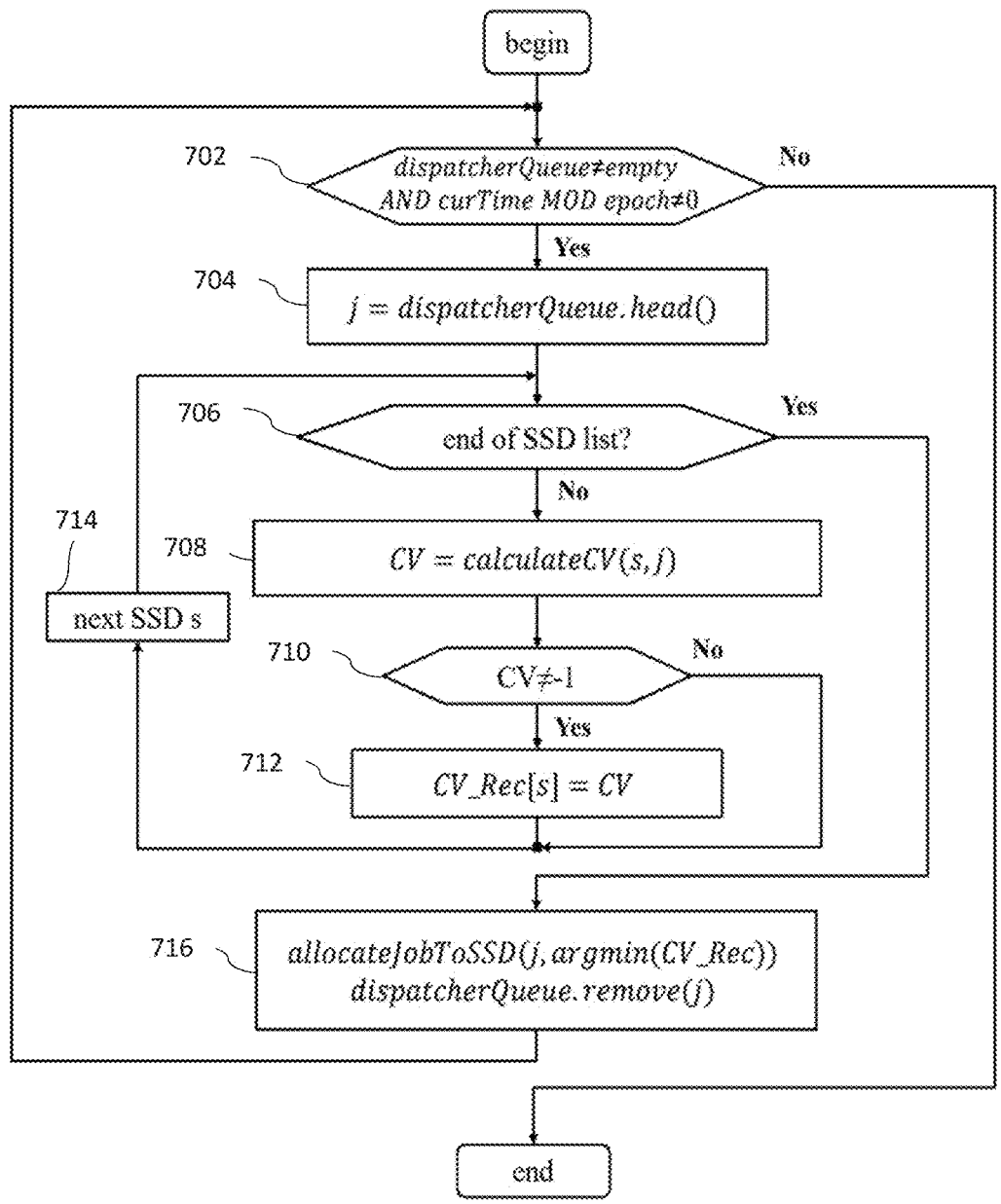
FIG. 7 is a flowchart illustrating a method for selection of SSDs when there is no workload spike is detected, according to an embodiment of the present disclosure.

FIG. 7 is a flowchart illustrating a method for selection of SSDs when no workload spike is detected, according to an embodiment of the present disclosure. Specifically, in cases involving no workload spike detection, the ACLB has time to conduct full optimization, in which strives to balance resources, such as, for example, throughput, bandwidth, space, and a worn-out level.

In step 702 of FIG. 7, it is determined whether the queue is empty and whether the current time is the beginning of an epoch. When the queue is not empty and the current time is not the beginning of an epoch, job j is set to the head of the dispatcher queue, in step 704. In step 706 it is determined whether the methodology has reached the end of the SSD list. If the methodology has reached the end of the SSD list, the methodology proceeds to step 716.

If the methodology has not reached the end of the SSD list, the ACLB calculates a coefficient variation (CV) for an SSD based on each type of resource (not limited to the four types described below), in step 708.

First, resources upon which load balance is conducted are specified. Specifically, there are multiple types of resources that SSDs provide, such as:

1. throughput (P): unit in I/O request per second (IOPS);
2. bandwidth (B): unit in bytes per second (BPS);
3. storage space (S): unit in bytes, related to workload address space, or working set size; and
4. program/erase (P/E) life cycles (L): each cell has limited lifetime, different workload patterns (such as sequential ratio, read write ratio) will have different write amplification on the SSD.

Ideally usage of all these resources would be balanced among the SSDs. Furthermore, to support both homogeneous and heterogeneous SSDs, a percentage format is utilized. More factors may also be included in the consideration of load balancing.

Second, it must be determined how to balance all resource utilization rates of all types of resources. CV is used to score a degree of balance for each type of average resource utilization rate, as set forth below in Equations (2) through (6).

min:

$$\omega_P \cdot CV(\overline{Util(P)}) + \omega_B \cdot CV(\overline{Util(B)}) + \omega_S \cdot CV(\overline{Util(S)}) + \omega_L \cdot CV(\overline{Util(L)}) \quad (2)$$

subject to:

$$\overline{Util(P)} \in [0, P_{max}] \quad (3)$$

$$\overline{Util(B)} \in [0, B_{max}] \quad (4)$$

$$\overline{Util(S)} \in [0, S_{max}] \quad (5)$$

$$\overline{Util(L)} \in [0, L_{max}] \quad (6)$$

Each type of resource may have a different weight based on the environment preference, as reflected by $\omega_S$. $P_{max}$, $B_{max}$, $S_{max}$, $L_{max}$ are preset upper bounds of a utilization ratio for each type of resource. Average utilization can be in a monitoring window, or an exponentially weighted moving average (EWMA) window that averages the data in a way that gives less and less weight to data as they are further removed in time.

Accordingly, the ACLB is required to know the runtime usage information of the storage pool, such as, for example, throughput, bandwidth, storage, and P/E cycle.

Throughput, bandwidth, and storage can be obtained by calling APIs of the hypervisor (112 of FIG. 1). However, for the P/E cycle, SSD vendors usually do not provide APIs to allow users to check real physical write amount. Thus, the actual physical write amount is estimated to calculate the usage of the P/E cycle based on a history record of jobs dispatched from the job scheduler. This can be estimated by using write amplification function (WAF) models, as set forth in Equation (7).

$$\lambda_P = \lambda_L \cdot WA(s,j) \quad (7)$$

where $\lambda_P$ and $\lambda_L$ are the physical and logical write amount (in bytes), respectively. The logical write is known from the application side. WA(s,j) is the write amplification function, which takes the SSD and new I/O stream to be assigned to this SSD, and then returns the write implication factor.

It may be costly to continuously pull the throughput, bandwidth, and storage from a storage pool with a large number of SSDs. Therefore, information is periodically pulled.

Referring back to FIG. 7, in step 710, it is determined whether CV returns a value of −1, which indicates that any one of the resources exceeds its corresponding resource upper bound. If a value of −1 is returned for the CV, the SSD is skipped and a next SSD is selected in step 712. If the resources do not exceed the resource upper bound, a result of the CV equation is added into a CV_Rec vector that stores results of the equation, in step 714, before selecting a next SSD, in step 712, and returning to step 706. The CV_Rec vector is defined as <CV(Util(ResourceType1)), CV(Util(ResourceType2)), CV(Util(ResourceType3))...>. Upon determining the end of the SSD list, in step 706, the ACLB picks the minimal CV result (as also shown in Equation (2)) and corresponding SSD for assignment of the job j, and also removes the job from the dispatcher queue, in step 716. The methodology then returns to step 702 to repeat.

Figure 8:
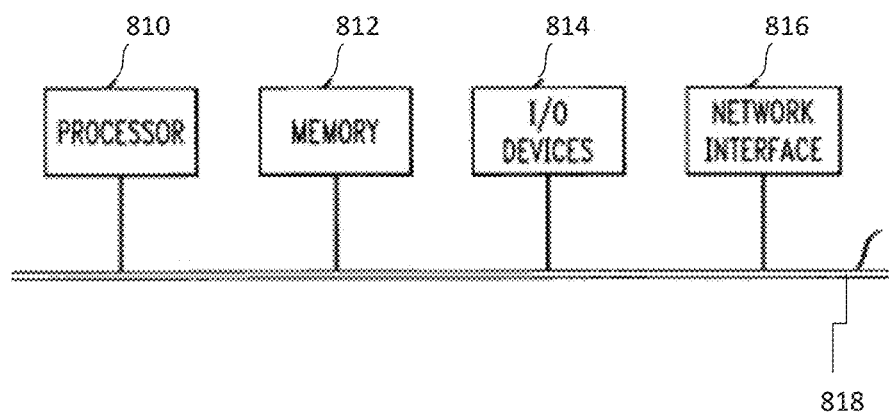
FIG. 8 is a block diagram illustrating an illustrative hardware implementation of a computing system, according to an embodiment of the present disclosure.

Referring now to FIG. 8, a block diagram illustrates an illustrative hardware implementation of a computing system in accordance with which one or more components/methodologies of the disclosure (e.g., components/methodologies described in the context of FIGS. 1-7) may be implemented. As shown, the computer system may be implemented in accordance with a processor 810, a memory 812, input/output (I/O) devices 814, and a network interface 816, coupled via a computer bus 818 or alternate connection arrangement.

It is to be appreciated that the term "processor", as used herein, is intended to include any processing device, such as, for example, one that includes, but is not limited to, a central processing unit (CPU) and/or other processing circuitry. It is also to be understood that the term "processor" may refer to more than one processing device and that various elements associated with a processing device may be shared by other processing devices.

The term "memory", as used herein, is intended to include memory associated with a processor or CPU, such as, for example, random access memory (RAM), read only memory (ROM), a fixed memory device (e.g., hard drive), a removable memory device, and flash memory.

In addition, the phrase "input/output devices" or "I/O devices", as used herein, is intended to include, for example, one or more input devices for entering information into the processor or processing unit, and/or one or more output devices for outputting information associated with the processing unit.

Still further, the phrase "network interface", as used herein, is intended to include, for example, one or more transceivers to permit the computer system to communicate with another computer system via an appropriate communications protocol. This may provide access to other computer systems.

Software components, including instructions or code, for performing the methodologies described herein may be stored in one or more of the associated memory devices (e.g., ROM, fixed or removable memory) and, when ready to be utilized, loaded in part or in whole (e.g., into RAM) and executed by a CPU.

The present disclosure may be utilized in conjunction with the manufacture of integrated circuits, which are considered part of the methods and apparatuses described herein.

Embodiments of the present disclosure detect and predict workload change (i.e., I/O spike prediction), and provide three different strategies for different spike degrees to better balance the loads across SSDs to improve performance and extend lifetime. Workload is balanced transparently to the user, VM I/O performance is improved, and SSD lifetime is extended.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
    detecting, by a processor of an application server layer, a degree of a change in a workload in an input/output stream received through a network;
    determining, by the processor, a distribution strategy, from among a plurality of distribution strategies, to distribute the workload across one or more of a plurality of solid state devices (SSDs) in a performance cache tier of a centralized multi-tier storage pool, based on the degree of the change; and
    distributing, by the processor, the workload across the one or more of the plurality of SSDs based on the determined distribution strategy,
    wherein the plurality of distribution strategies comprises at least a first strategy and a second strategy, which are based on joining a shortest queue,
    wherein the first strategy as the distribution strategy is used in accordance with a first number of most idle SSDs, the second strategy as the distribution strategy is used in accordance with a second number of most idle SSDs, and the first number is different from the second number.

2. The method of claim 1, further comprising determining a degree range, from preset degree ranges, that the degree of the change in the workload is within, wherein the distribution strategy is determined based on the determined degree range.

3. The method of claim 2, wherein the preset degree ranges comprise a strong workload spike range, a weak workload spike range, and a non-spike range.

4. The method of claim 3, wherein the plurality of distribution strategies comprises:
    a join shortest queue (JSQ)-based runtime random-greedy algorithm used in accordance with a large range of idlest SSDs from the plurality of SSDs, which corresponds to the strong workload spike range;
    a JSQ-based runtime random-greedy algorithm used in accordance with a small range of idlest SSDs from the plurality of SSDs, which corresponds to the weak workload spike range; and
    an optimization framework calculation, which corresponds to the non-spike range.

5. The method of claim 4, wherein the determined distribution strategy comprises the JSQ-based runtime random-greedy algorithm, and further comprising:
    sorting the plurality of SSDs by a number of active I/O streams that are queued; and
    randomly selecting an SSD from the large range of idlest SSDs or the small range of idlest SSDs for assignment of a job of the workload.

6. The method of claim 4, wherein the determined distribution strategy comprises the optimization framework calculation, and further comprising:
    calculating coefficient variations for the plurality of SSDs using a plurality of resources;
    determining that one of the plurality of resources exceeds respective upper bounds for the plurality of SSDs based on a respective coefficient variation;
    skipping assignment to a given SSD, based on the one of the plurality of resources exceeding the respective upper bounds; and
    choosing an SSD with a minimal coefficient variation result for assignment of a job of the workload.

7. The method of claim 1, wherein the degree of the change of the workload is based on a squared coefficient of variation and an autocorrelation function at a given lag.

8. The method of claim 1, wherein the degree of the change of the workload is determined based on working volume, working volume size, or working set size.

9. The method of claim 8, wherein the degree of the change of the workload is further determined based on at least one of a read/write ratio and a sequential/random ratio.

10. An apparatus, comprising:
    a memory; and
    a processor configured to:
        detect a degree of a change in a workload in an input/output stream received through a network;
        determine a distribution strategy, from among a plurality of distribution strategies, to distribute the workload across one or more of a plurality of solid state devices (SSDs) in a performance cache tier of a centralized multi-tier storage pool, based on the degree of the change; and
        distribute the workload across the one or more of the plurality of SSDs based on the determined distribution strategy,
        wherein the plurality of distribution strategies comprises at least a first strategy and a second strategy, which are based on joining a shortest queue, and
        wherein the first strategy as the distribution strategy is used in accordance with a first number of most idle SSDs, the second strategy as the distribution strategy is used in accordance with a second number of most idle SSDs, and the first number is different from the second number.

11. The apparatus of claim 10, wherein:
the processor is further configured to determine a degree range, from preset degree ranges, that the degree of the change in the workload is within; and
the distribution strategy is determined based on the determined degree range.

12. The apparatus of claim 11, wherein the preset degree ranges comprise a strong workload spike range, a weak workload spike range, and a non-spike range.

13. The apparatus of claim 12, wherein the plurality of distribution strategies comprises:
a join shortest queue (JSQ)-based runtime random-greedy algorithm used in accordance with a large range of idlest SSDs from the plurality of SSDs, which corresponds to the strong workload spike range;
a JSQ-based runtime random-greedy algorithm used in accordance with a small range of idlest SSDs from the plurality of SSDs, which corresponds to the weak workload spike range; and
an optimization framework calculation, which corresponds to the non-spike range.

14. The apparatus of claim 13, wherein the determined distribution strategy comprises the JSQ-based runtime random-greedy algorithm, and the processor is further configured to:
sort the plurality of SSDs by a number of active I/O streams that are queued; and
randomly select an SSD from the large range of idlest SSDs or the small range of idlest SSDs for assignment of a job of the workload.

15. The apparatus of claim 13, wherein the determined distribution strategy comprises the optimization framework calculation, and the processor is further configured to:
calculate coefficient variations for the plurality of SSDs using a plurality of resources, respectively;
determine that one of the plurality of resources exceeds respective upper bounds for the plurality of SSDs based on a respective coefficient variation;
skip assignment to a given SSD based on the one of the plurality of resources exceeding the respective upper bounds; and
choose an SSD with a minimal coefficient variation result for assignment of a job of the workload.

16. The apparatus of claim 10, wherein the degree of the change of the workload is calculated based on a squared coefficient of variation and an autocorrelation function at a given lag.

17. The apparatus of claim 10, wherein the degree of the change of the workload is determined based on working volume, working volume size, or working set size.

18. The apparatus of claim 17, wherein the degree of the change of the workload is further determined based on at least one of a read/write ratio and a sequential/random ratio.

* * * * *